United States Patent [19]

Yajima et al.

[11] 4,159,259

[45] Jun. 26, 1979

[54] ORGANOSILICON HIGH MOLECULAR WEIGHT COMPOUNDS

[75] Inventors: Seishi Yajima; Josaburo Hayashi; Mamoru Omori, all of Oharai, Japan

[73] Assignee: The Research Institute for Iron, Steel and Other Metals of the Tohoku University, Sendai, Japan

[21] Appl. No.: 770,138

[22] Filed: Feb. 18, 1977

[30] Foreign Application Priority Data

Feb. 28, 1976 [JP] Japan .................. 51-21365

[51] Int. Cl.$^2$ .................. C08G 77/60; C08G 77/54
[52] U.S. Cl. .................. 528/14; 204/159.13; 528/16; 528/17; 528/18; 528/15; 528/31; 528/32; 528/37
[58] Field of Search .................. 260/2 S, 448.27; 106/43, 45; 423/345, 347; 204/159.13

[56] References Cited

U.S. PATENT DOCUMENTS

| | | | |
|---|---|---|---|
| 2,441,066 | 5/1948 | Hanford | 260/2 S X |
| 2,483,972 | 10/1949 | Goodwin | 260/2 S X |
| 2,554,193 | 5/1951 | Hunter | 260/2 S X |
| 2,557,782 | 6/1951 | Clark | 260/2 S X |
| 2,563,004 | 8/1951 | Clark | 260/2 S |
| 3,070,582 | 12/1962 | Gutweiler et al. | 204/159.13 |
| 3,159,668 | 12/1964 | Rochow | 260/2 S X |
| 3,178,392 | 4/1965 | Kriner | 260/448.2 D |
| 3,178,392 | 4/1965 | Kriner | 260/2 S X |
| 3,278,461 | 10/1966 | Wu | 260/2 S |
| 3,293,194 | 10/1966 | Lovie et al. | 260/2 S |
| 3,398,178 | 8/1968 | Nelson | 260/2 S X |
| 3,415,728 | 12/1968 | Bostick | 204/159.13 |
| 3,422,039 | 1/1969 | Nametkin et al. | 260/448.2 D |
| 3,702,317 | 11/1972 | Breed et al. | 260/2 S X |
| 3,853,567 | 12/1974 | Verbeek | 106/44 |
| 3,892,583 | 7/1975 | Winter et al. | 106/43 X |

Primary Examiner—Lewis T. Jacobs
Attorney, Agent, or Firm—Ladas, Parry, Von Gehr, Goldsmith & Deschamps

[57] ABSTRACT

Organosilicon high molecular weight compounds containing silicon and carbon as the main skeleton components and organosilicon high molecular weight compounds containing silicon and carbon as the main skeleton components and 0.01–20% by weight of at least one foreign element other than silicon, carbon, hydrogen and oxygen have a number average molecular weight of 500–30,000, and intrinsic viscosity of 0.01–1.50 and a silicon carbide residual amount of not less than 40% by weight after baked at a temperature of 800°–1,500° C. in a non-oxidizing atmosphere and are useful for the production of silicon carbide moldings.

6 Claims, 4 Drawing Figures

ORGANOSILICON HIGH MOLECULAR WEIGHT COMPOUNDS

The present invention relates to novel organosilicon high molecular weight compounds useful for the production of silicon carbide moldings.

In general, silicon carbide decomposes at a temperature above 2,500° C., and is lowest in the oxidation resistance among various carbides, hard next to diamond and boron carbide, small in the thermal expansion coefficient, excellent in the thermal conductivity, chemical resistance and thermal shock resistance, and exhibits a semiconductive property. Owing to these properties, silicon carbide is used as abrasive material, grinding material, refractory, heating element, varistor, thermistor, heat-resistant coating material or the like.

The silicon carbide is usually produced by heating silicon dioxide and carbon at a temperature above 1,500° C. However, the thus obtained silicon carbide is irregular in the shape, so that it is pulverized and molded to provide a molding by a recrystallization or the like. As a result, there are drawbacks that it is difficult to produce moldings having complicated shapes, and that the production step becomes complicated and the production temperature is high.

Furthermore, the silicon carbide molding is produced by a chemical vapor-deposition method. For instance, silicon carbide is deposited by heating a mixed gas of dichloromethylsilane and hydrogen at a temperature above 1,200° C. In this method, however, the shape of the molding is limited to very simple ones such as plate, rod, fiber and the like.

The inventors have found that novel organosilicon high molecular weight compounds as defined below are very useful as a starting material for the production of silicon carbide moldings, and the present invention has been accomplished.

Heretofore, various organosilicon high molecular compounds were synthesized from the corresponding organosilicon compounds. However, there is no attempt to produce moldings by a heat treatment of such organosilicon high molecular weight compounds.

According to the present invention, it has been found out that when the organosilicon high molecular weight compound is subjected to the heat treatment at elevated temperatures, silicon and carbon contained in the compound react with each other to produce silicon carbide (SiC). Furthermore, the following fact has been found. When the residual amount of SiC is small, it is very difficult to retain a desired shape of the molding because of large amount of volatile materials. Therefore, the organosilicon compounds having a low molecular weight and organosilicon high molecular weight compounds having a small SiC residual amount after baked at an elevated temperature cannot be used as the starting material for the production of SiC moldings. On the contrary, in the case of using the novel organosilicon high molecular weight compounds according to the present invention, i.e. organosilicon high molecular weight compounds containing silicon and carbon as the main skeleton components and having a number average molecular weight of 500–30,000, an intrinsic viscosity of 0.01–1.50 and an SiC residual amount of not less than 40% by weight after baked at a temperature of 800–1,500°C. in a non-oxidizing atmosphere, if they are baked to produce an SiC molding, the amount of volatile materials is small and the production amount of SiC becomes considerably larger, so that it is possible to retain the desired shape of the molding.

The term "molding" used herein means to include primary products derived only from the organosilicon high molecular weight compound, such as fiber, filament, flake, powder, film, coating, foamed body and the like; secondary products using as a binder SiC obtained by baking the organosilicon high molecular weight compound, such as mat, fibrid, block, pipe, crucible, plate, cover, rotary grindstone and the like; and another secondary products obtained by reacting the organosilicon high molecular weight compound with metal powder at an elevated temperature, such as cermet material, cutting tool, press tool, die material, heat-resistant nozzle, turbine blade, engine part, heating element, heat-resistant material and the like.

The invention will now be described in greater detail with reference to the accompanying drawings, wherein.

Figure 1:
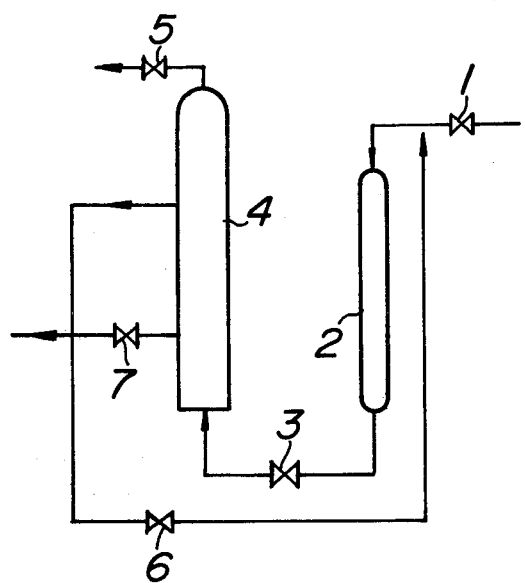
FIG. 1 is a schematically flow-sheet illustrating an embodiment of the apparatus for producing organosilicon high molecular weight compounds according to the present invention.

According to the present invention, one or more organosilicon compounds selected from the following groups (1)–(10) are used as the starting material for producing an organosilicon high molecular weight compound containing silicon and carbon as the main skeleton components.

(1) Compounds having only Si-C bond

Silahydrocarbons, such as $R_4Si$, $R_3Si(R'SiR_2)_nR'SiR_3$, carbon-functional derivatives thereof belong to this group. For example,

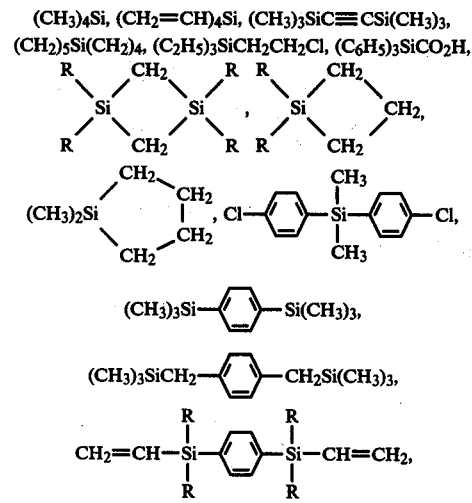

-continued

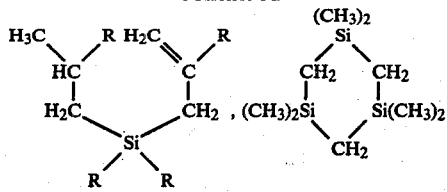

(2) Compounds having Si-H bond in addition to Si-C bond

Mono-, di-, and triorganosilanes belong to this group. For example, $(C_2H_5)_2SiH_2$, $(CH_2)_5SiH_2$, $(CH_3)_3SiCH_2Si(CH_3)_2H$, $ClCH_2SiH_3$,

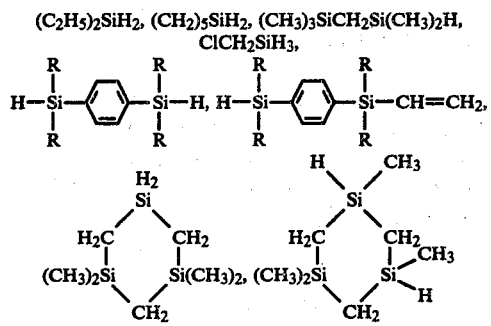

(3) Compounds having Si-Hal bond

Organohalogensilanes.
For example, $CH_2{=}CHSiF_3$, $C_2H_5SiHCl_2$,
$(CH_3)_2(ClCH_2)SiSi(CH_3)_2Cl$, $(C_6H_5)_3SiBr$,

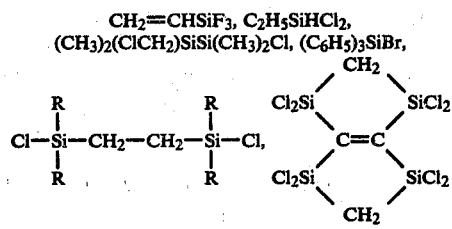

(4) Compounds having Si-N bond

Silylamines belong to this group.
For example,

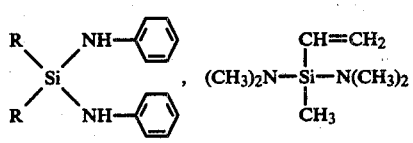

(5) Si-OR organoalkoxy (or aroxy) silanes

For example, $(CH_3)_2Si(OC_2H_5)_2$, $C_2H_5SiCl_2(OC_2H_5)$,
p-$ClC_6H_4OSi(CH_3)_3$,

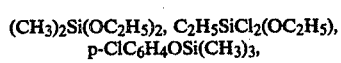

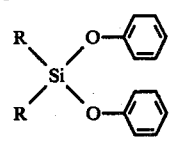

(6) Compounds having Si-OH bond

Organosilanes.
For example, $(C_2H_5)_3SiOH$, $(CH_3)_2Si(OH)_2$,
$C_6H_5Si(OH)_3$, $(HO)(CH_3)_2SiCH_2Si(CH_3)_2 \cdot (OH)$,

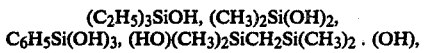

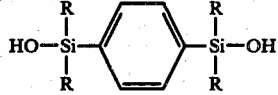

(7) Compounds having Si-Si bond

For example, $(CH_3)_3SiSi(CH_3)_2Cl$, $(CH_3)_3SiSi(CH_3)_3$,
$(C_6H_5)_3SiSi(C_6H_5)_2Si(C_6H_5)_2Cl$,

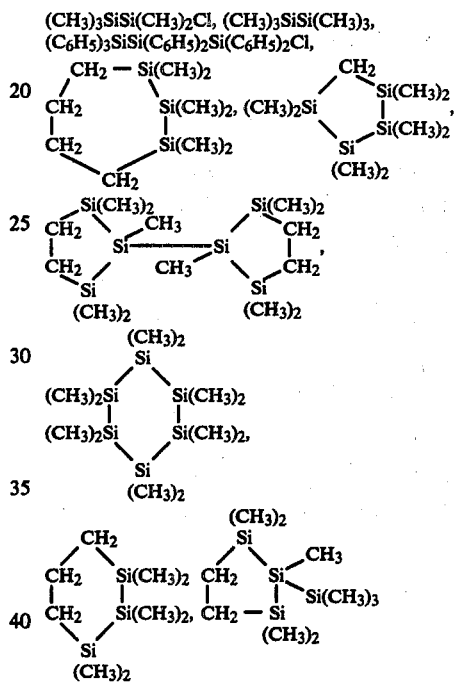

(8) Compounds having Si-O-Si bond

Organosiloxanes.
For example, $(CH_3)_3SiOSi(CH_3)_3$, $HO(CH_3)_2SiOSi(CH_3)_2OH$,
$Cl_2(CH_3)SiOSi(CH_3)ClOSi(CH_3)Cl_2$, $[(C_6H_5)_2SiO]_4$,
$CH_2{=}C(CH_3)CO_2CH_5Si \cdot (CH_3)_2CH_2O_2C(CH_3){=}CH_2$

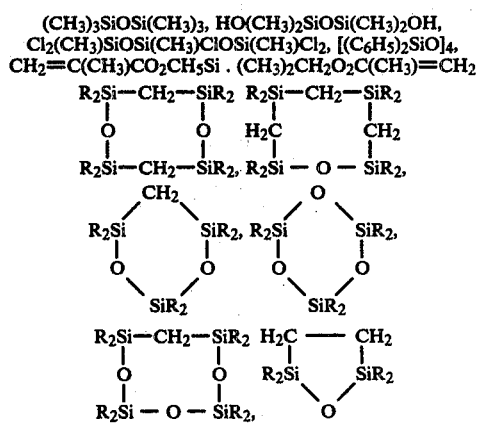

(9) Esters of organosilicon compounds

Esters formed from silanols and acids.

$(CH_3)_2Si(OCOCH_3)_2$

(10) Peroxides of organosilicon compounds $(CH_3)_3SiOOC(CH_3)_3$, $(CH_3)_3SiOOSi(CH_3)_3$ In the above described groups (1)–(10), R represents an alkyl group or an aryl group.

According to the present invention, the above described starting material is used to form an organosilicon high molecular weight compound containing silicon and carbon as the main skeleton components. For example, the compounds having the following molecular structures are produced.

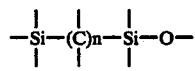
(a)

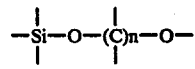
(b)

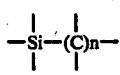
(c)

(d) The compounds having the above described skeleton components (a)–(c) as at least one partial structure in linear, ring and three dimensional structures or mixtures of the compounds having the above described skeleton components (a)–(c).

The compounds having the above described molecular structures are, for example, as follows.

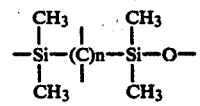
(a)

n=1, poly(silmethylenesiloxane),
n=2, poly(silethylenesiloxane),
n=6, poly(silphenylenesiloxane)

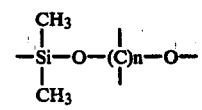
(b)

n=1, poly(methyleneoxysiloxane),
n=2, poly(ethyleneoxysiloxane),
n=6, poly(phenyleneoxysiloxane),
n=12, poly(diphenyleneoxysiloxane)

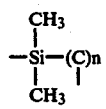
(c)

n=1, polysilmethylene,
n=2, polysilethylene,
n=3, polysiltrimethylene,
n=6, polysilphenylene,
n=12, polysildiphenylene (d) The compounds having the above described skeleton components as at least one partial structure in linear, ring and three dimensional structures or mixtures of the compounds having the above described skeleton components (a)–(c).

In order to produce the organosilicon high molecular weight compounds according to the present invention in which silicon and carbon are the main skeleton components, the starting materials of the organosilicon compounds belonging to the above described groups (1)–(10) are subjected to polycondensation reaction by using at least one process of irradiation, heating and addition of a polycondensation catalyst.

For example, some well known reaction formulae for obtaining the above described organosilicon high molecular weight compounds containing silicon and carbon as the main skeleton components from the above described starting materials belonging to the groups (1)–(10) through at least one process of addition of the catalyst, irradiation and heating, are exemplified as follows.

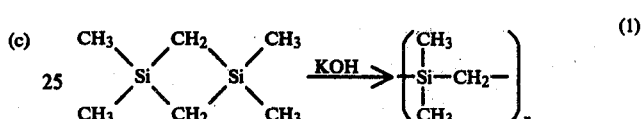
(1)

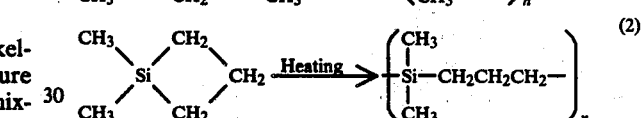
(2)

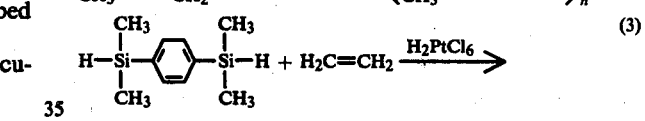
(3)

(4)

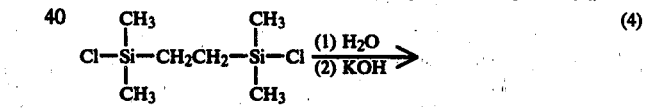
(5)

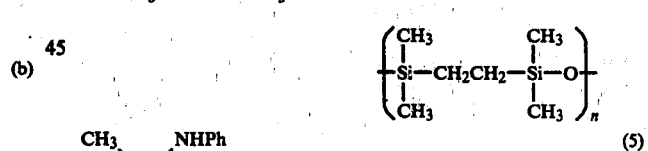
(6)

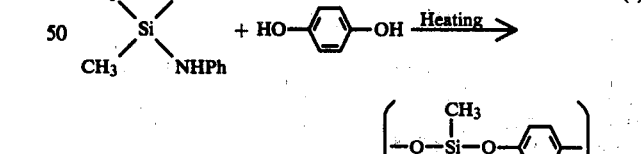
(7)

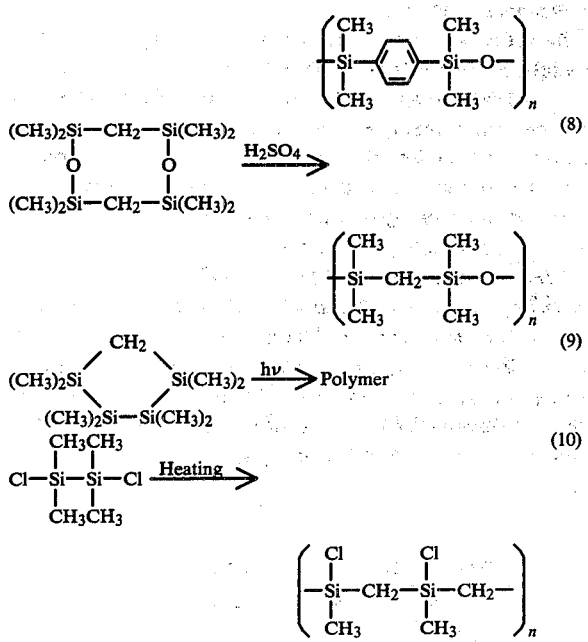

Besides, one or more organosilicon compounds selected from the above described groups (1)-(10) is polymerized by heating within a temperature range of 200°-1,500° C. or the irradiation of γ-ray, X-ray, UV-ray, electron beam and the like, under vacuum or in a gaseous atmosphere selected from an inert gas, hydrogen gas, CO gas, $CO_2$ gas, hydrocarbon gas and organosilicon compound gas, if necessary, under pressure to produce the organosilicon high molecular weight compounds containing silicon and carbon as the main skeleton components.

The reason why the above described reaction should be effected within the temperature range of 200°-1,500° C. is as follows. When the temperature is lower than 200° C., the synthesis reaction does not satisfactorily proceed, while when the temperature is higher than 1,500° C., the decomposition reaction is violently caused to produce an SiC compound and it is impossible to form fibers in the subsequent step, so that the temperature range must be 200° to 1,500° C. and best results can be obtained within the temperature range of 300°-1,200° C.

In the above described synthesis reaction, a free-radical initiator of not more than 10% may be added to the above described starting material, if necessary. The free-radical initiators are, for example, benzoyl peroxide, di-tert.-butyl peroxyoxalate, di-tert.-butyl peroxide, azobisisobutyronitrile and the like. The above described synthesis reaction does not always need these free-radical initiators, but this use permits to lower the temperature for starting the reaction by the succeeding heating or to increase a number average molecular weight of the reaction product.

When the amount of the free-radical initiator added is more than 10%, the addition effect is not particularly expected, so that such an amount is uneconomical. Therefore, the amount of the free-radical initiator must be not more than 10% and best results can be obtained within a range of 0.01 to 1%.

When oxygen is present upon heating in the above described synthesis reaction, the free-radical polycondensation reaction does not occur due to oxygen or even if said reaction occurs, the reaction stops in the course, so that the polycondensation reaction must be effected by heating in a gaseous atmosphere selected from an inert gas, hydrogen gas, CO gas, $CO_2$ gas, a hydrocarbon gas and an organosilicon compound gas or under vacuum.

In the thermal polycondensation reaction, a pressure is generated, so that it is not always necessary to apply particularly a pressure but when a pressure is applied, such pressure may be applied by means of at least one atmosphere of an inert gas, hydrogen gas, CO gas, $CO_2$ gas, a hydrocarbon gas and an organosilicon compound gas.

An embodiment of apparatus for the above described synthesis reaction is a stationary autoclave. In this case, the heating temperature is preferred to be 300°-500° C. Another embodiment for the above described synthesis reaction is shown in FIG. 1. In this drawing, from a valve 1, the starting material is fed into a heating reaction column 2, wherein the heating is effected at a temperature of 200°-1,500° C., preferably 500°-1,200° C. The resulting reaction products including the organosilicon high molecular weight compound for the production of silicon carbide moldings according to the present invention are discharged from the heating reaction column 2 through a valve 3 and fed into a separating column 4 wherein distillation and separation are effected. Then, the formed gas is discharged from the column 4 through a valve 5 and a high molecular weight compound is taken out from the column 4 through a valve 7. The low molecular weight compounds separated in the column 4 are circulated into the heating reaction column 2 through a valve 7.

In the polycondensation reaction by irradiation, the use of γ-ray is most effective in view of economy. In this case, the dose of γ-ray is preferably within a range of $10^7$-$10^{11}$ roentgen. When the dose is less than $10^7$ roentgen, the polycondensation reaction hardly occurs, while the dose of more than $10^{11}$ roentgen is uneconomical. Further, in case of X-ray irradiation, the polycondensation reaction takes place at an output of more than 5 kW. In order to effect the polycondensation reaction by electron beam irradiation, the acceleration voltage of the electron beam is within a range of 1-1×$10^3$ kV. And also, in case of UV-ray irradiation, the polycondensation reaction takes place at an output of more than 1 kW.

A mechanism in which the organosilicon high molecular weight compounds containing silicon and carbon as the main skeleton components are produced by the above described synthesis reaction will be explained hereinafter, for example, in the case of synthesis from methylchlorosilane.

Methyl group of methylchlorosilane is decomposed into a methyl free radical and silyl free radical by the heating. The methyl free radical takes out hydrogen from methyl group bonded to silicon to form carbon free radical and methane gas is formed. On the other hand, hydrogen free radical is formed from methyl group bonded to silicon and at the same time carbon free radical is also formed. Presumably, the silyl free radical and the carbon free radical formed as described above bond to form silicon-carbon bond and the organosilicon high molecular weight compounds can be formed based on the above described reaction and the above described hydrogen free radical becomes hydrogen gas.

The thus obtained organosilicon high molecular weight compound according to the present invention is called as a polycarbosilane and consists of at least one of linear polycarbosilanes, cyclic polycarbosilanes, polycarbosilanes obtained by chemically bonding linear polycarbosilane with cyclic polycarbosilane and mixtures thereof.

Figure 2:
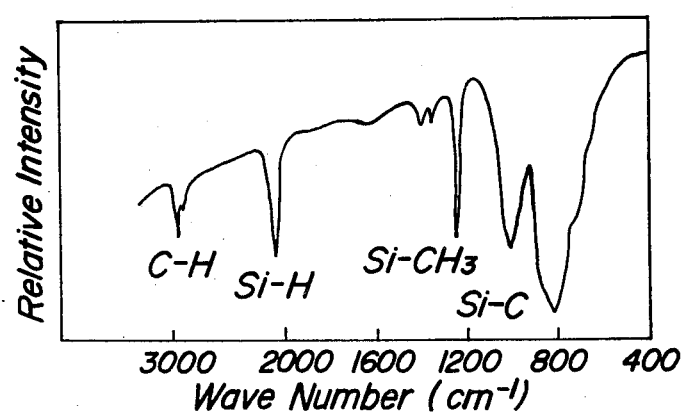
FIG. 2 is an infrared absorption spectrum of the organosilicon high molecular weight compound according to the present invention.

The polycarbosilane is constituted with molecules having C-H bond (2,900–3,000 cm$^{-1}$), Si-H bond (2,100 cm$^{-1}$), Si-CH$_3$ bond (1,240 cm$^{-1}$) and Si-C bond (1,050 cm$^{-1}$, 805 cm$^{-1}$) as seen from the infrared absorption spectrum of FIG. 2, so that silicon and carbon forms the main skeleton components.

The linear polycarbosilanes are represented by the following molecular structure:

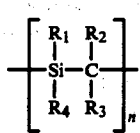

wherein R$_1$, R$_2$, R$_3$ and R$_4$ are hydrogen atom, alkyl group, aryl group, silyl group or halogen atom, respectively.

Some typical examples of cyclic polycarbosilanes are as follows:

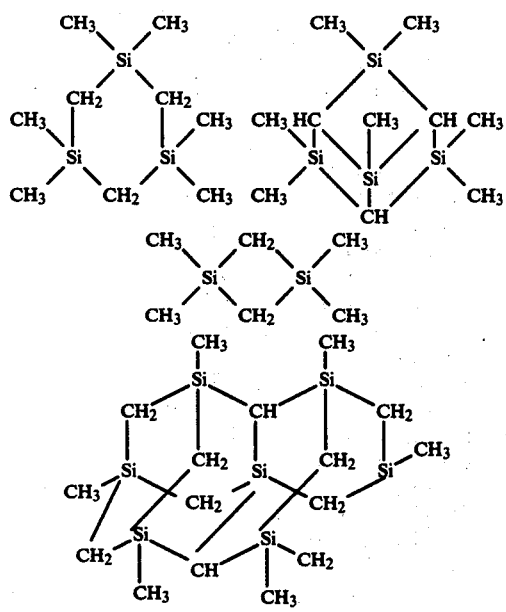

Furthermore, some typical examples of polycarbosilanes obtained by chemically bonding the linear polycarbosilane with the cyclic polycarbosilane are as follows.

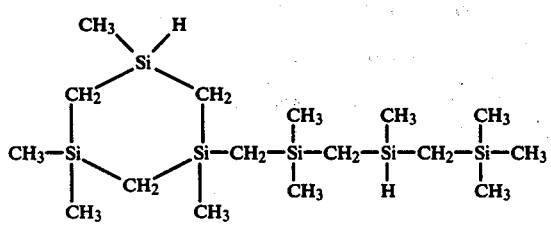

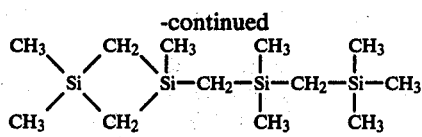

In the organosilicon high molecular weight compounds according to the present invention, the reason why the main skeleton components should be constituted with silicon and carbon is due to the fact that if silicon and carbon are existent in the side chains of the compound, they are vaporized as a gas during the baking and the SiC residual amount becomes less.

The reason why the number average molecular weight is within a range of 500–30,000 is as follows. When the number average molecular weight is smaller than 500, if the compound is baked at a temperature above 800° C. in a non-oxidizing atmosphere, the SiC residual amount is small and the amount of volatile gas becomes larger and hence the molding is foamed or deformed, so that it is difficult to retain the shape prior to the baking. While, when the number average molecular weight is larger than 30,000, the SiC residual amount after the baking of the compound becomes larger, but the compound is hardly melted by heating and is insoluble in a solvent, so that it is difficult to produce the molding from the compound.

The reason why the intrinsic viscosity is within a range of 0.01–1.50 is as follows. When the intrinsic viscosity is lower than 0.01, the molding cannot be formed and the SiC residual amount becomes smaller when it is baked at a temperature above 800° C. in a non-oxidizing atmosphere. While, when the intrinsic viscosity is higher than 1.5, it is difficult to produce the molding from the compound.

Furthermore, the reason why the SiC residual amount after baked at a temperature of 800°–1,500° C. in a non-oxidizing atmosphere is not less than 40% by weight is as follows. When the SiC residual amount is less than 40%, if the molding is formed from the organosilicon high molecular weight compound and then baked at a temperature of 800°–1,500° C. in a non-oxidizing atmosphere, the production amount of SiC is small and the amount of volatile gas becomes considerably larger, so that it is very difficult to retain the shape prior to the baking.

Figure 3:
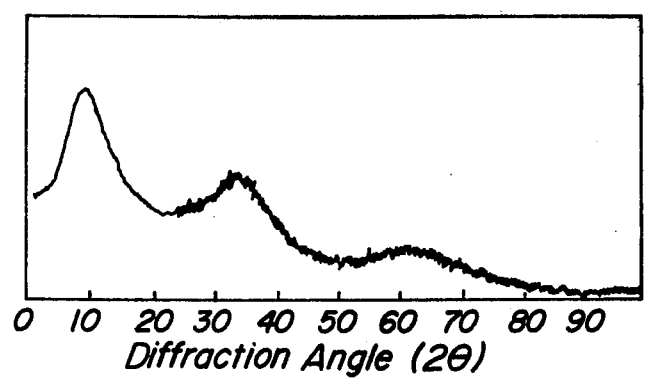
FIG. 3 is an X-ray diffraction pattern of the organosilicon high molecular weight compound according to the present invention by an X-ray diffractometry.
Figure 4:
FIG. 4 is an X-ray diffraction photograph of the fiber made from the organosilicon high molecular weight compound according to the present invention by a pinhole method.

Among the organosilicon high molecular weight compounds according to the present invention, the polycarbosilane having a number average molecular weight of 1,500 and an intrinsic viscosity of 0.09 is observed by an X-ray diffractometry to have only a typical amorphous diffraction pattern as shown in FIG. 3. Further, when the fiber made from this polycarbosilane is observed by a pinhole method, the intensity of the X-ray diffraction ring is uniform as shown in FIG. 4, so that the fiber is found to be a substantially complete amorphous body.

According to the present invention, organosilicon high molecular weight compounds containing silicon and carbon as the main skeleton components and further at least one foreign element other than silicon, carbon, hydrogen and oxygen can also be used as the starting material for the production of SiC moldings in addition to the above mentioned organosilicon high molecular weight compounds. In this case, the number average molecular weight, intrinsic viscosity and SiC residual amount must satisfy the above defined ranges, respectively.

Furthermore, the amount of the foreign element in the organosilicon high molecular weight compound should be within a range of 0.01–20% by weight. When the amount of the foreign element is less than 0.01%, the addition effect is not particularly expected, while when the amount exceeds 20%, the addition effect is unchanged.

The effect of adding the foreign element to the organosilicon high molecular weight compound is as follows. For example, when the organosilicon high molecular weight compound containing at least one element of Li, V and Pb is baked at a temperature above 1,000° C. in a non-oxidizing atmosphere to produce an SiC molding, the above metal element or a compound thereof (e.g. carbide, silicide or the like) is remaining in the molding, so that the oxidation resistance of the molding is improved 2 times more than that of the molding containing no metal element or the compound thereof.

Furthermore, when the organosilicon high molecular weight compound containing at least one metal element capable of forming a carbide as shown in the following Table 1 is baked at a temperature above 800° C. in a non-oxidizing atmosphere, the resulting silicon carbide molding contains the metal carbide shown in Table 1 in addition to SiC.

Table 1

| | |
|---|---|
| Be$_2$C | LaC$_2$ |
| B$_4$C | CeC$_2$ |
| Al$_4$C | PrC$_2$ |
| CaC$_2$ | NdC$_2$ |
| TiC | SmC$_2$ |
| VC | GdC$_2$ |
| Cr$_3$C$_2$ | TbC$_2$ |
| Mn$_3$C | DyC$_2$ |
| Fe$_3$C | ErC$_2$ |
| SrC$_2$ | TmC$_2$ |
| YC$_2$ | HfC |
| ErC | TaC |
| NbC | WC |
| Mo$_2$C | ThC |
| BaC$_2$ | UC |

For instance, if at least one hard carbide of Be$_2$C, B$_4$C, SiC, TiC, ZrC, HfC, VC, NbC, TaC, ThC, UC, HoC, WC, Mo$_2$C, Cr$_3$C$_2$, Cr$_7$C$_3$ and Cr$_{23}$C$_6$ is existent as the metal carbide in the SiC molding, the strength and hardness of the molding are increased. Therefore, it is very advantageous to produce the silicon carbide molding starting from the organosilicon high molecular weight compound containing the foreign metal element. Furthermore, each of the aforementioned metal carbides and other metal carbides bonds with SiC to suppress the crystal growth of SiC in the molding, so that silicon carbide moldings having improved strength, hardness and heat stability are obtained.

If only the organosilicon high molecular weight compound containing no foreign element is baked in a non-oxidizing atmosphere, free carbon may be formed in the SiC molding. This free carbon decreases the strength and hardness of the molding. On the contrary, if the organosilicon high molecular weight compound contains a metal capable of forming the aforementioned carbide, the free carbon in the SiC molding reacts with the metal element to form the carbide, so that the amount of free carbon in the molding becomes smaller and hence the strength and heat resistance of the molding are improved.

Moreover, when the organosilicon high molecular weight compound containing a metal element other than Li, Pb, V and carbide-forming elements is baked in a non-oxidizing atmosphere to form a silicon carbide molding, the metal element is chemically bonded with SiC, so that the strength of the molding is increased and the heat resistance and thermal shock resistance are improved.

In another embodiment of using the organosilicon high molecular weight compound containing the foreign element according to the present invention, the silicon carbide molding is produced by using a ceramic or a metal as a matrix and the organosilicon high molecular weight compound containing the foreign element as a binder and baking them in a non-oxidizing atmosphere. In this case, the foreign element serves to improve the bonding property of the matrix to silicon carbide because it is existent in silicon carbide bonding the matrix. For example, when a powder of ZrB$_2$ is used as a matrix and the organosilicon high molecular weight compound containing boron is used as a binder, the matrix is bonded to SiC produced from the compound through boron contained in SiC, so that the bonding property of the matrix to SiC in the resulting molding is improved and consequently the molding has excellent strength, heat resistance and thermal shock resistance. When the molding is produced by using ceramics shown in the following Table 2 as a matrix and the organosilicon high molecular weight compound containing the metal element contained in the matrix as a binder, the bonding property of the matrix to SiC produced from the compound is improved, so that the strength, heat resistance and thermal shock resistance of the molding are improved.

Table 2-1

| Oxide | Melting point °C. | Density g/cm$^2$ | Carbide | Melting point °C. | Density g/cm$^2$ | Nitride | Melting point °C. | Density g/cm$^2$ | Boride | Melting point °C. | Density g/cm$^2$ | Silicide | Melting point °C. | Density g/cm$^2$ |
|---|---|---|---|---|---|---|---|---|---|---|---|---|---|---|
| BeO | 2,550 | 3.03 | Be$_2$C | 2,150 | 2.44 | Be$_3$N$_2$ | 2,240 | — | | | | | | |
| | — | — | B$_4$C | 2,450 | 2.52 | BN | 3,000 | 2.34 | — | — | — | | | |
| MgO | 2,800 | 3.58 | | | | Mg$_3$N$_2$ | 1,027 | — | | | | | | |
| Al$_2$O$_3$ | 2,015 | 3.97 | Al$_4$C$_3$ | 2,800 | 2.99 | AlN | 2,450 | 3.26 | AlB$_4$ | 1,100 | | | | |
| SiO$_2$ | 1,723 | 2.32 | SiC | 2,400 | 3.21 | Si$_3$N$_4$ | 1,920 | 3.18 | | | | — | — | — |
| CaO | 2,600 | 3.32 | CaC$_2$ | 2,300 | 2.04 | Ca$_3$N$_2$ | | | CaB$_6$ | >2,100 | 2.33 | CaSi | 1,245 | — |
| Sc$_2$O$_3$ | 2,300 | 3.89 | | | | ScN | 2,650 | 4.21 | | | | | | |
| TiO | 1,840 | 4.24 | TiC | 3,140 | 4.25 | TiN | 2,950 | 5.21 | TiB$_2$ | 2,600 | 4.52 | Ti$_5$Si$_3$ | 2,120 | 4.32 |
| V$_2$O$_3$ | 1,977 | 4.87 | VC | 2,830 | 6.70 | VN | 2,030 | 6.04 | VB$_2$ | 2,400 | 5.01 | V$_5$Si$_3$ | — | 5.30 |
| Cr$_2$O$_3$ | 2,265 | 5.21 | Cr$_3$C$_2$ | 1,895 | 6.70 | CrN | 1,493 | 6.1 | BrB$_2$ | 1,900 | 5.20 | CrSi$_2$ | 1,550 | 5.0 |
| MnO | 1,780 | 5.40 | Mn$_3$C | 1,520 | 6.89 | Mn$_3$N$_2$ | >1,100 | — | MnB | — | 6.2 | | | |
| Fe$_2$O$_3$ | 1,560 | 5.12 | Fe$_3$C | 1,630 | 7.67 | | | | FeB | 1,550 | 7.15 | FeSi | 1,400 | — |
| CoO | 1,805 | 6.46 | | | | | | | CoB | — | 7.25 | CoSi | 1,460 | — |

Table 2-1-continued

| Oxide | Melting point °C. | Density g/cm² | Carbide | Melting point °C. | Density g/cm² | Nitride | Melting point °C. | Density g/cm² | Boride | Melting point °C. | Density g/cm² | Silicide | Melting point °C. | Density g/cm² |
|---|---|---|---|---|---|---|---|---|---|---|---|---|---|---|
| NiO | 1,950 | 6.8 | | | | | | | NiB | 1,020 | 7.39 | | | |

Table 2-2

| Oxide | Melting point °C. | Density g-cm² | Carbide | Melting point °C. | Density g/cm² | Nitride | Melting point °C. | Density g/cm² | Boride | Melting point °C. | Density g/cm² | Silicide | Melting point °C. | Density g/cm² |
|---|---|---|---|---|---|---|---|---|---|---|---|---|---|---|
| CuO | 1,026 | 6.40 | | | | | | | | | | | | |
| ZnO | 1,975 | 5.66 | | | | | | | | | | | | |
| SrO | 2,415 | 4.7 | SrC₂ | 1,927 | 3.04 | Sr₃N₂ | 1,027 | — | SrB₆ | >2,100 | 3.31 | | | |
| Y₂O₃ | 2,410 | 4.84 | YC₂ | 2,210 | — | | | | YB₆ | — | 3.75 | | | |
| ZrO₂ | 2,677 | 5.56 | ZrC | 3,530 | 6.70 | ZrN | 2,980 | 6.93 | ZrB₂ | 3,000 | 6.17 | ZrSi₂ | 1,520 | 4.9 |
| Nb₂O₃ | 1,510 | 4.47 | NbC | 3,500 | 7.82 | NbN | 2,030 | 8.4 | NbB₂ | 3,050 | 6.95 | NbSi₂ | 1,950 | 5.29 |
| | | | Mo₂C | 2,687 | 8.9 | Mo₃N₂ | — | — | MoB₂ | 2,100 | 5.1 | MoSi₂ | 2,030 | 6.12 |
| BaO | 1,923 | 5.72 | BaC₂ | 1,780 | 3.81 | | | | BaB₆ | >2,100 | 4.36 | | | |
| La₂O₃ | 2,305 | 6.51 | LaC₂ | 2,360 | — | | | | LaB₆ | >2,100 | — | | | |
| CeO₂ | >2,600 | 7.13 | CeC₂ | 2,290 | — | | | | CeB₆ | '2,100 | — | | | |
| Pr₆O₁₁ | 2,200 | 7.07 | PrC₂ | 2,160 | | | | | PrB₆ | — | — | | | |
| Nd₂O₃ | 2,270 | 7.24 | NdC₂ | 2,260 | — | NdN | 1,024 | 7.69 | NdB₆ | — | — | | | |
| Sm₂O₃ | 2,350 | 7.0 | SmC₂ | — | — | | | | SmB₆ | — | 5.07 | | | |
| Eu₂O₃ | 2,050 | 7.42 | | | | | | | EuB₆ | — | 4.95 | | | |

Table 2-3

| Oxide | Melting point °C. | Density g/cm² | Carbide | Melting point °C | Density g/cm² | Nitride | Melting point °C. | Density g/cm² | Boride | Melting point °C. | Density g/cm² | Silicide | Melting point °C. | Density g/cm² |
|---|---|---|---|---|---|---|---|---|---|---|---|---|---|---|
| Gd₂O₃ | 2,350 | 7.04 | GdC₂ | 2,260 | — | | | | GdB₆ | — | — | | | |
| Tb₂O₃ | — | 7.81 | TbC₂ | 2,100 | — | | | | TbB₆ | — | — | | | |
| Dy₄O₇ | 2,340 | 8.2 | DyC₂ | 2,250 | — | | | | DyB₆ | — | 5.35 | | | |
| Ho₂O₃ | — | 8.36 | | | | | | | HoB₆ | — | — | | | |
| Er₂O₃ | — | 8.65 | ErC₂ | 2,280 | — | | | | ErB₆ | — | — | | | |
| Tm₂O₃ | — | 8.77 | TmC₂ | 2,180 | — | | | | TmB₆ | — | — | | | |
| Yb₂O₃ | 2,346 | 9.28 | | | | | | | YbB₆ | — | — | | | |
| Lu₂O₃ | 2,320 | 9.42 | | | | | | | LuB₆ | — | — | | | |
| HfO₂ | 2,777 | 9.68 | HfC | 3,887 | 12.20 | HfN | 3,307 | 14.0 | HfB₂ | 3,250 | 11.19 | | | |
| Ta₂O₅ | 1,890 | 8.02 | TaC | 3,877 | 14.48 | TaN | 2,980 | 14.1 | TaB₂ | 3,200 | 12.56 | TaSi₂ | 2,200 | 8.4 |
| WO₃ | >2,130 | 7.16 | WC | 2,867 | 15.50 | WN₂ | >2,100 | — | WB | 2,860 | 16.0 | WSi₂ | 2,180 | 9.8 |
| ThO₂ | 3,300 | 9.69 | ThC | 2,625 | 10.65 | ThN | 2,360 | 11.5 | ThB₆ | >2,100 | 6.4 | | | |
| UO₂ | 2,280 | 10.96 | UC | 2,250 | 13.63 | UN | 2,630 | 14.32 | UB₄₄ | — | 9.32 | | | |

When a molding is produced by baking a mixture of metal powder and the organosilicon high molecular weight compound containing the foreign element according to the present invention in a non-oxidizing atmosphere, the metal powder can be rapidly and uniformly reacted with the foreign element of the compound, so that the interaction between the metal and the foreign element is very advantageous.

According to the present invention, the organosilicon high molecular weight compound containing at least one foreign element can be, for example, represented by the following molecular structures:

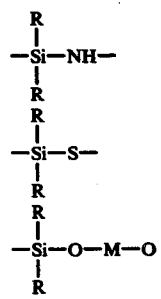

Silazane

Silthiane

Metallosiloxane

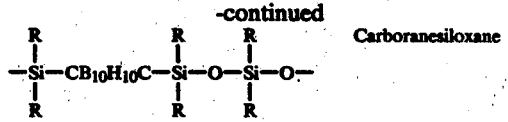

Carboranesiloxane

In the above formulae, M represents a foreign element, and R represents a hydrogen atom, an alkyl group or an aryl group.

Furthermore, the organosilicon high molecular weight compounds containing at least one foreign element according to the present invention can be produced by starting from a mixture of at least one organosilicon compound selected from the aforementioned groups (1)–(10) and at least one of the organosilicon compound of the group (4) and organometallic compounds (inclusive coordination compounds) selected from the following groups (11)–(18). In this case, the latter organosilicon compound of the group (4) to be used as the starting material gives nitrogen atom as the foreign element to the organosilicon high molecular weight compound different from the production of the organosilicon high molecular weight compound containing no foreign element as shown by the above mentioned reaction formula (5).

(11) Organometallic compounds containing a metal of Group I (inclusive coordination compounds)

For example,
$CH_3Li$, $C_2H_5Na$, $C_6H_5Li$, $KCH_3$,
$AgCH_3$, $AuC_3H_9$, $CuCH_3$

(12) Organometallic compounds containing a metal of Group II (inclusive coordination compounds)

For example,
$BeC_2H_6$, $MgCH_2$, $CaC_2H_6$, $BaC_2H_6$,
$ZnC_4H_{10}$, $CdC_2H_6$, $HgCH_3Br$, $SrC_2H_6$

(13) Organometallic compounds containing a metal of Group III (inclusive coordination compounds)

For example,
$BCH_5O_2$, $BC_3H_9$, $AlC_2H_7$, $GaCH_3O$,
$InC_2H_8N$, $InC_3H_9$, $TlC_3H_9$, $Sc(CH_3COCHCOCH_3)_3$,
$La(CH_3COCHCOCH_3)_3$, $Ce(CH_3COCHCOCH_3)_4$,
$Pr(CH_3COCHCOCH_3)_3$, $Nd(CH_3COCHCOCH_3)_3$,
$Sm(CH_3COCHCOCH_3)_3$, $Eu(CH_3COCHCOCH_3)_3$,
$Gd(CH_3COCHCOCH_3)_3$, $Tb(CH_3COCHCOCH_3)_3$,
$Dy(CH_3COCHCOCH_3)_3$, $Ho(CH_3COCHCOCH_3)_3$,
$Er(CH_3COCHCOCH_3)_3$, $Tm(CH_3COCHCOCH_3)_3$,
$Yb(CH_3COCHCOCH_3)_3$, $Ln(CH_3COCHCOCH_3)_3$

(14) Organometallic compounds containing a metal of Group IV (inclusive coordination compounds)

For example,
$HfC_{10}H_{10}Cl_2$, $GeC_2H_8$, $SnC_2H_8$,
$PbC_2H_8$, $TiC_{10}H_{10}$, $ZrC_{10}H_{10}Cl_2$

(15) Organosilicon compounds containing a metal of Group V (inclusive coordination compounds)

For example,
$VC_6O_6$, $NbC_6O_6$, $TaC_6O_6$, $C_4H_4N$, $PC_2H_5O_5$,
$PC_2H_7$, $AsCH_3S$, $AsC_2H_7$, $SbC_2H_7$, $BiC_3H_9$

(16) Organometallic compounds containing a metal of Group VI (inclusive coordination compounds)

For example,
$WC_8H_6O_3$, $C_2H_5SH$, $SeCH_2$, $TeC_2H_6$,
$PoC_2H_6$, $MoC_6H_6$, $CrC_6H_8N_2O_2$

(17) Organometallic compounds containing a metal of Group VII (inclusive coordination compounds)

For example,
$MnC_{12}H_{10}$, $TcC_{10}H_{10}$, $ReC_6H_3O_5$

(18) Organometallic compounds containing a metal of Group VIII (inclusive coordination compounds)

For example,
$FeC_{10}H_{10}$, $CoC_6H_5O_3$, $NiC_6H_{10}$, $RuC_{10}H_{10}$,
$RhC_9H_{13}$, $PdC_8H_{10}$, $PdC_5H_5Cl$, $OsC_{10}H_{10}$,
$IrC_3O_3$, $PtC_4H_{12}$ The method and apparatus of producing the organosilicon high molecular weight compound containing at least one foreign element are the same as mentioned above relating to the production of the organosilicon high molecular weight compounds containing no foreign element.

A mechanism in which the organosilicon high molecular weight compounds containing the foreign element are produced by the thermal polycondensation reaction from the mixture of the organosilicon compound and the organometallic compound, will be explained below, for example, in the case of using polysilane as the organosilicon compound. That is, Si—Si bond of the polysilane is cleaved into silyl free radicals by the heating, whereby the reaction is started. The silyl free radical takes out hydrogen atom from methyl group bonded to silicon to form carbon free radical. The adjacent silicon atom is rearranged into the resulting carbon free radical to form Si—C bond. On the contrary, the silyl free radical reacts with the organometallic compound containing the foreign element to form a free radical in the organometallic compound. This free radical reacts with Si—Si bond of the polysilane and further silicon atom reacts with the organometallic compound, whereby the organosilicon high molecular weight compound containing the foreign element is produced.

In the organosilicon high molecular weight compound containing at least one foreign element according to the present invention, the presence of the foreign element can be confirmed by an infrared absorption spectrum and a nuclear magnetic resonance spectrum and the amount thereof can be quantified by an elemental analysis. Furthermore, the number average molecular weight of the organosilicon high molecular weight compound containing the foreign element is depended upon the starting materials, heating temperature and heating time, but it is found to be within a range of 500 to 30,000 by means of a molecular weight determination apparatus.

The following examples are given for the purpose of illustration of the invention and are not intended as limitations thereof.

EXAMPLE 1

Dimethyldichlorosilane and sodium were reacted to produce dimethylpolysilane. 250 g of dimethylpolysilane was charged in an autoclave having a capacity of 1 l and air in the autoclave was substituted with argon gas and then the reaction was effected at 470° C. for 14 hours. After completion of the reaction, the formed polycarbosilane was discharged as hexane solution. This hexane solution was filtrated to remove impurities and then hexane was evaporated under a reduced pressure, after which the residue was heated in an oil bath at 280° C. under vacuum for 2 hours to effect concentration. Polycarbosilane ($\overline{M}=1,700$, $[\eta]=0.5$) was obtained in an yield of 40% based on dimethyldichlorosilane. By using a usual spinning apparatus, the polycarbosilane was heated and melted at 330° C. in argon gas atmosphere to form a spinning melt and the spinning melt was spun at a spinning rate of 200 m/min to obtain polycarbosilane fibers. The fibers were heated by raising the temperature from 20° C. to 190° C. in air in 6 hours and this temperature was kept for 1 hour to effect an unfusing treatment. The thus treated fibers were heated to 1,300° C. at a temperature raising rate of 100° C./hr under vacuum of $1 \times 10^{-3}$ mmHg and this temperature was kept for 1 hour to form SiC fibers. The formed SiC fibers was obtained in a yield of 51%, and had an average diameter of 15μ, an average tensile strength of 350 kg/mm$^2$, an average Young's modulus of $23 \times 10^3$ kg/mm$^2$ and a specific gravity of 2.70 g/cm$^3$.

EXAMPLE 2

In an autoclave was charged 10 g of dodecamethylcyclohexasilane [$(Me_2Si)_6$] and air in the autoclave was substituted with argon gas and then the reaction was effected at 400° C. under about 40 atmospheric pressure for 48 hours to obtain an organosilicon high molecular weight compound having silicon and carbon as the main skeleton components. The resulting product was left to stand at room temperature and extracted with ether and then ether was evaporated to obtain 6.6 g of the solid compound. This compound was soluble in benzene and had a number average molecular weight of 1,500 and an intrinsic viscosity of 0.4. When this compound was baked up to 1,400° C. at a rate of 300° C./hr in nitrogen gas atmosphere, a lumpy SiC was obtained in a yield of 65%.

EXAMPLE 3

In an autoclave were charged 10 g of octaphenylcyclotetrasilane and 0.1 g of benzoyl peroxide and air in the autoclave was substituted with argon gas and then the reaction was effected at 420° C. under about 35 atmospheric pressure for 24 hours. After completion of the reaction, the formed organosilicon high molecular weight compound was discharged as hexane solution. This hexane solution was filtrated to remove impurities and then hexane was evaporated to obtain 7.1 g of the solid compound. This compound had a number average molecular weight of 1,100 ($[\eta]=0.09$).

10 g of the solid compound was dissolved in benzene and mixed with 90 g of SiC powder passed through 250 mesh and then the resulting mixture was placed in a molding apparatus, press molded and baked up to 1,300° C. at a rate of 100° C./hr under vacuum to form a SiC molding. In this case, SiC was obtained from the compound in a yield of 63%.

EXAMPLE 4

In an autoclave were charged 10 g of a mixture of cyclic dimethylpolysilanes (Me$_2$Si)n (n=5 and 6) and 0.5 g of azobisisobutyronitrile and air in the autoclave was substituted with argon gas and then the reaction was effected at 470° C. under about 80 atmospheric pressure for 12 hours. After completion of the reaction, the resulting reaction product was discharged as benzene solution. This benzene solution was filtrated and benzene was evaporated under a reduced pressure to obtained 4.8 g of a solid organosilicon high molecular weight compound. This compound had a number average molecular weight of 7,000–8,000 ($[\eta]=1.1$).

15 g of the compound was mixed with 85 g of Ti powder passed through 250 mesh in benzene and then baked up to 1,300° C. at a rate of 100° C./hr under vacuum to obtain a super hard material.

When only the compound was baked under vacuum, the yield of SiC was 81%.

EXAMPLE 5

In an autoclave was charged 10 g of a mixture of cyclic diphenylsilanes (Ph$_2$Si)n (n=4 and 5) and linear polydiphenylsilane and air in the autoclave was substituted with argon gas and then the reaction was effected at 380° C. under about 60 atmospheric pressure for 50 hours. After completion of the reaction, the resulting product was discharged as benzene solution and concentrated under a reduced pressure to obtain 6.9 g of a solid organosilicon high molecular weight compound. This compound had a number average molecular weight of 1,800 ($[\eta]=0.45$).

The solid compound was dissolved in benzene and spun in a usual spinning method to obtain fibers.

Furthermore, the solid compound was baked up to 1,300° C. at a rate of 200° C./hr under vacuum to obtain SiC in a yield of 58%, which was pulverized into SiC powder.

EXAMPLE 6

An organosilicon high molecular weight compound was produced from hexamethyldisilane under an atmospheric pressure by using the apparatus shown in FIG. 1.

At first, the hexamethyldisilane was introduced into a reaction column heated to 750° C. at a rate of 1 l/hr together with argon gas to effect a decomposition reaction and a polycondensation reaction therein, whereby the organosilicon high molecular weight compound and low molecular weight compound were produced. The organosilicon high molecular weight compound could be partly taken out from the reaction column, but the almost of the organosilicon high molecular weight compound was fed into a fractionating column together with the low molecular weight compound and separated into gas, the low molecular weight compound and the organosilicon high molecular weight compound. The low molecular weight compound was recycled into the reaction column. After 10 hours of the operation, 5.4 kg of the organosilicon high molecular weight compound was obtained with a number average molecular weight of about 1,800 ($[\eta]=0.38$).

This organosilicon high molecular weight compound could be spun into fibers at 68° C. in a usual spining method. Furthermore, this compound was baked up to 1,000° C. at a rate of 100° C./hr in argon gas atmosphere to obtain SiC in a yield of 63%.

The organosilicon high molecular weight compound was dissolved in benzene, applied to a quartz plate, dried and baked up to 1,400° C. at a rate of 100° C./hr in argon gas atmosphere, whereby an SiC film with a thickness of 5 μm was obtained.

EXAMPLE 7

100 g of linear polysilane was placed in a quartz reactor and heated at 350° C. under reflux for 4 hours and further slowly heated up to 470° C. while removing volatile fraction. Thereafter, the resulting product was cooled, discharged as hexane solution, filtrated, concentrated through a tap aspirator and further concentrated at 200° C. through a vacuum pump to obtain 43 g of a polycarbosilane. The polycarbosilane had a number average molecular weight of 1,700 and an intrinsic viscosity of 0.28.

The polycarbosilane was baked up to 1,300° C. at a rate of 250° C./hr in nitrogen gas atmosphere to obtain lumpy SiC in a yield of 61%. This lumpy SiC was pulverized into powders passed through 250 mesh. A mixture of 90% by weight of the thus obtained powder and 10% by weight of the polycarbosilane was thoroughly stirred in hexane and thereafter hexane was evaporated. The residue was press molded and baked up to 1,300° C. at a rate of 100° C./hr in nitrogen gas atmosphere to obtain an SiC molding. The bending strength of the SiC molding was 55 kg/cm$^2$.

Example 8

Into a three-necked flask of 5 l capacity were charged 2.5 l of metallic sodium and then 1 l of dimethyldichlorosilane was added dropwise thereto in argon gas atmosphere. After completion of the addition, the resulting mixture was further heated under reflux in argon gas atmosphere for 8 hours to form precipitates. These precipitates were filtrated and washed with methanol and further with water to obtain 415 g of white powdery polysilane.

25 g of the polysilane and 2.5 g of hexamethyldisilazane was fed into an autoclave and the reaction was effected at 450° C. for 2 hours. After completion of the reaction, the resulting product was taken out from the autoclave with hexane, filtrated and concentrated by heating at 150° C. under vacuum to obtain 11 g of a solid organosilicon high molecular weight compound ($\overline{M}=1,600$, $[\eta]=0.27$).

This compound was heated at 290° C. in a spinning apparatus and then spun through a spinneret having an orifice of 300 μm diameter at a spinning rate of 500 m/min to obtain filaments having a diameter of 10 μm. The filaments were subjected to a non-fusing treatment by raising the temperature from room temperature to 150° C. in 2.5 hours and then from 150° C. to 180° C. in 0.5 hour in air, and then heated up to 1,400° C. at a rate of 100° C./hr under vacuum and maintained at this temperature for 1 hour to obtain silicon carbide fibers (yield: 55%). These silicon carbide fibers contained 1.9% of nitrogen.

For this comparison, silicon carbide fibers containing no nitrogen were produced starting from polycarbosilane made only of polysilane in the same manner as described above.

The change of tensile strength was measured with respect to the two kinds of the above silicon carbide fibers when using at 1,500° C. for a long period of time to obtain a result as shown in the following Table 3.

Table 3

|  | Tensile strength (kg/mm$^2$) | | | | |
| --- | --- | --- | --- | --- | --- |
|  | 10 hr. | 50 hr. | 100 hr. | 200 hr. | 400 hr. |
| Control | 430 | 390 | 350 | 280 | 105 |
| Present invention | 420 | 410 | 405 | 390 | 350 |

As seen from the above data of Table 3, even if the silicon carbide fiber made from the organosilicon high molecular weight compound containing nitrogen according to the present invention was heated at a high temperature for a long period of time, the decrease of tensile strength was considerably little.

EXAMPLE 9

A mixture of 10 kg of dodecamethylcyclohexasilane and 0.5 kg of hexamethyldisilane was subjected to a thermal polycondensation reaction in the apparatus shown in FIG. 1. The mixture preheated at 120° C. was fed into a heating reaction column 2 (pipe heater having a whole length of 1.5 m) through a velve 1 at a rate of 2 l/hr, where the mixture was heated at 650° C. to produce an organosilicon high molecular weight compound containing nitrogen. The reaction product formed in this column was charged into a separating column 4 and separated into gas, low molecular weight compounds and high molecular weight compounds. Among them, the gas was discharged from the column through a valve 5 and the high molecular weight compounds were recovered from the column through a valve 7. The low molecular weight compounds were fed into the heating reaction column 2 through a valve 6 as a recycling material.

The thus obtained organosilicon high molecular weight compound was heated, filtered and concentrated by heating at 150° C. under vacuum to obtain a solid organosilicon high molecular weight compound ($\overline{M}=800$, $[\eta]=0.05$).

10 g of this solid compound was dissolved in 100 cc of hexane and added with 90 g of α-SiC powder (containing 30% of finely divided powder passed through 250 mesh) to form an intimate mixture. This intimate mixture was dried to remove hexane and then molded into a cubic body of 20×20×20 mm under pressure. The cubic body was baked up to 1,300° C. at a rate of 100° C./hr under vacuum and maintained at this temperature for 1 hour to obtain an SiC sintered body (the yield of SiC from the organosilicon compound was 51%).

For the comparison, an SiC sintered body was produced by using polycarbosilane made only of polysilane as a binder in the same manner as described above.

The compression strength was measured with respect to these two SiC sintered bodies when heating at 1,600° C. for a long period of time to obtain a result as shown in the following Table 4.

Table 4

|  | Compression strength (kg/cm$^2$) | | | | |
| --- | --- | --- | --- | --- | --- |
|  | 10 hr. | 20 hr. | 100 hr. | 200 hr. | 300 hr. |
| Control | 6,800 | 6,500 | 3,200 | 1,300 | 500 |
| Present invention | 6,900 | 6,800 | 6,000 | 5,100 | 4,500 |

As seen from the above data of Table 4, the SiC sintered body obtained by using the organosilicon high molecular weight compound containing nitrogen according to the present invention had an excellent heat resistance.

EXAMPLE 10

In an autoclave of 1 l capacity were charged 200 g of tetramethylsilane and 24 g of titanium oxyacetylacetonate and then the reaction was effected at 440° C. for 15 hours. After completion of the reaction, the resulting product was taken out from the autoclave with hexane, filtered and concentrated by heating at 150° C. under vacuum to obtain 84 g of an organosilicon high molecular weight compound containing titanium ($\overline{M}=1,000$, $[\eta]=0.07$).

This compound was heated at 80° C. and impregnated into carbon bricks (100×200×400 mm) under vacuum. These carbon bricks were embedded in a bed of coke granules and sintered by raising the temperature from room temperature to 400° C. in 4 hours and from 400° C. to 800° C. in 8 hours and from 800° C. to 1,200° C. at a rate of 200° C./hr. Thereafter, the thus sintered carbon bricks were again impregnated with the above organosilicon high molecular weight compound and sintered up to 1,600° C. in the same manner as described above to form silicon carbide-impregnated carbon bricks (the yield of SiC from the organosilicon compound was 53%).

For the comparison, carbon bricks were treated with an organosilicon high molecular weight compound synthesized only from tetramethylsilane in the same manner as described above.

The high temperature compression strength was measured with respect to the two kinds of the above SiC-impregnated carbon bricks to obtain a result as shown in the following Table 5. The carbon brick according to the present invention was higher in the temperature compression strength than the control containing no titanium and particularly the compression strength at 1,600° C. became considerably higher.

Table 5

|  | Compression strength (kg/cm²) | | |
|---|---|---|---|
|  | 1,000° C. | 1,300° C. | 1,600° C. |
| Control | 850 | 630 | 350 |
| Present invention | 830 | 780 | 670 |

EXAMPLE 11

A mixture of 10 kg of dimethyldichlorosilane, 500 g of chromium acetate and 500 g of molybdenum hexacarbonyl was fed into the apparatus as shown in FIG. 1, where an organosilicon high molecular weight compound containing chromium and molybdenum was synthesized at a temperature of 680° C. in the same manner as described in Example 9. This compound contained 0.4% of chromium and 0.9% of molybdenum ($\overline{M}=900$, $[\eta]=0.1$). A sintered body was manufactured from zirconia powder with the above organosilicon high molecular weight compound in the same manner as described in Example 9 (the yield of SiC from the organosilicon compound was 49%).

For the comparison, a sintered body was manufactured from the zirconia powder and an organosilicon high molecular weight compound made only of dimethyldichlorosilane in the same manner as described above.

The compression strength of the two sintered bodies was measured at 1,600° C. in air for a long period of time to obtain a result as shown in the following Table 6.

Table 6

|  | Compression strength (kg/cm²) | | | |
|---|---|---|---|---|
|  | 10 hr. | 50 hr. | 100 hr. | 200 hr. |
| Control | 4,800 | 4,100 | 3,100 | 1,800 |
| Present invention | 5,200 | 4,800 | 4,400 | 4,100 |

As seen from the above date of Table 6, the sintered body obtained by using the organosilicon high molecular weight compound containing the metal elements according to the present invention had little decrease of compression strength even if it was heated in air for a long period of time.

EXAMPLE 12

In an autoclave were charged 100 g of tetramethyldisilacryclobutane, 50 g of dimethylchlorosilane and 2 g of benzoyl peroxide and air in the autoclave was substituted with argon gas and then the reaction was effected at 460° C. for 15 hours. The resulting product was discharged as benzene solution, filtrated and concentrated at 150° C. to obtain 80 g of an organosilicon high molecular weight compound. This compound had a number average molecular weight of 1,400, an intrinsic viscosity of 0.30 and an SiC residual amount of 63% after baked at 800° C. in argon gas atmosphere.

15% by weight of the compound was mixed with 85% by weight of MgO powder passed through 325 mesh and then the resulting mixture was press molded and baked up to 1500° C. at a rate of 100° C./hr in nitrogen gas atmosphere to obtain a molding. The bending strength of the molding was 20 kg/cm².

EXAMPLE 13

A molding was produced by using a polysilmethylenesiloxane

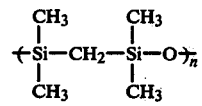

having a number average molecular weight of 18,000, an intrinsic viscosity of 1.1 and an SiC residual amount of 48% after baked at 1,000° C. in argon gas atmosphere as an organosilicon high molecular weight compound.

A mixture of 20% by weight of the compound, 60% by weight of $Cr_2O_3$ passed through 250 mesh and 20% by weight of $La_2O_3$ was molded and baked up to 1,700° C. in argon gas atmosphere to obtain the molding. This molding did not decompose even at 1,500° C. in air and exhibited no oxidation increment. The bending strength of the molding was 15 kg/cm².

EXAMPLE 14

A molding was produced by using a polysilphenylenesiloxane

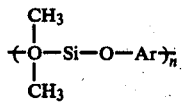

having a number average molecular weight of 28,000, an intrinsic viscosity of 1.2 and an SiC residual amount of 65% after baked at 1,000° C. under vacuum as an organosilicon high molecular weight compound.

A mixture of 15% by weight of the compound, 60% by weight of WC powder and 25% by weight of W powder was stirred in benzene and the benzene was evaporated. Thereafter, the residue was press molded and baked up to 1,400° C. at a rate of 50° C./hr under vacuum to obtain a sintered molding. The molding had a bending strength of 110 kg/cm² and could provide a super hard cermet having a hardness ($H_RA$) of 95.

EXAMPLE 15

In an autoclave were charged 200 g of dimethylpolysilane (n=55) and an organometallic compound shown in the following Table 7 and then the reaction was effected at 460° C. for 13 hours. The resulting product was discharged as benzene solution and concentrated by heating under vacuum to obtain an organosilicon high molecular weight compound containing a foreign element.

The yield, number average molecular weight and intrinsic viscosity of the thus obtained compounds are also shown in Table 7. Furthermore, the SiC residual amount after baked up to 1,000° C. at a rate of 100° C./hr in argon gas atmosphere is shown in Table 7.

Then, 13% by weight of the organosilicon high molecular weight compound was mixed with a corresponding powder sample shown in Table 7 and molded and baked up to 1,000° C. at a rate of 100° C./hr under vacuum to obtain a molding having a value of the bending strength shown in Table 7.

Table 7

| Organometallic compound | Addition amount (g) | Yield (%) | Number average molecular weight $\overline{M}$ | Intrinsic viscosity ($\eta$) | SiC residual amount (%) | Powder sample | Bending strength (kg/mm$^2$) |
| --- | --- | --- | --- | --- | --- | --- | --- |
| LiCH$_3$ | 15 | 56 | 1,600 | 0.41 | 51 | SiC | 10 |
| CuC$_3$H$_3$ClN | 7 | 57 | 1,800 | 0.31 | 65 | MgO Cu$_2$O | 13 |
| MgC$_2$H$_3$Cl | 13 | 49 | 1,200 | 0.18 | 49 | MgO | 16 |
| ZnC$_4$H$_{10}$ | 12 | 53 | 1,600 | 0.26 | 56 | ZnO SiO$_2$ | 8 |
| Y(CH$_3$COCHCOCH$_3$)$_3$ | 25 | 45 | 1,300 | 0.25 | 46 | Cr$_2$O$_3$ | 15 |
| AlC$_4$H$_{12}$N | 9 | 65 | 1,100 | 0.13 | 43 | Al$_4$O$_3$ | 20 |
| TiC$_{10}$H$_{10}$Cl$_2$ | 11 | 52 | 1,300 | 0.21 | 61 | TiC | 45 |
| PbC$_3$H$_{10}$O | 17 | 48 | 1,200 | 0.15 | 57 | SiC | 13 |
| VC$_5$H$_5$Cl$_2$O | 16 | 59 | 1,500 | 0.51 | 51 | VC | 31 |
| WC$_{10}$H$_{12}$ | 20 | 45 | 1,700 | 0.40 | 63 | WC | 27 |
| SeC$_2$H$_3$N | 10 | 71 | 1,600 | 0.36 | 62 | Mo | 80 |
| MnCH$_3$I | 20 | 45 | 1,300 | 0.13 | 53 | MnO Al$_2$O$_3$ | 16 |
| FeC$_{10}$H$_{10}$ | 15 | 53 | 1,500 | 0.39 | 57 | Fe$_3$O$_4$ | 11 |
| CoC$_6$H$_5$O$_3$ | 15 | 51 | 1,700 | 0.12 | 61 | CoO SiO$_2$ | 13 |
| NiC$_{10}$H$_{10}$ | 16 | 49 | 900 | 0.09 | 42 | Ni$_2$SiO$_4$ Mg$_2$SiO$_4$ | 12 |

EXAMPLE 16

Into a three-necked flask of 10 l capacity were charged 5 l of decalin anhydride and 800 g of sodium and then the resulting mixture was heated in a stream of nitrogen gas to melt the sodium and 2 l of dimethyldichlorosilane was added dropwise thereto. After completion of the addition, the resulting mass was heated under reflux for 3 hours to form precipitates. The precipitates were filtrated and thoroughly washed with methanol and further with water to obtain 830 g of a white powdery polysilane. Then, 100 g of this polysilane and 10 g of BC$_3$H$_9$O$_2$ were placed in a glass tube and then air in the tube was substituted with argon gas. After the tube was sealed, the polycondensation reaction was effected at room temperature by irradiating $\gamma$-ray of $2 \times 10^8$ roentgen from a source of Co-60 45 KCi to obtain 83 g of an organosilicon high molecular weight compound containing boron. This compound had a number average molecular weight of 1,400 and an intrinsic viscosity of 0.31.

This compound was spun in a usual spinning method to form filaments. The filaments were subjected to a non-fusing treatment and then heated by raising the temperature up to 1,300° C. at a rate of 100° C./hr under vacuum ($1 \times 10^{-3}$ mmHg) and maintained at 1,300° C. for 1 hour to obtain silicon carbide fibers (yield: 60%).

The thus obtained fibers had a mean tensile strength of 300 kg/mm$^2$ and a mean resiliency of 32 ton/mm$^2$ when the average diameter of the fiber was 10 μm. By the addition of boron, the resiliency was improved 50% higher than that of the fiber containing no boron.

EXAMPLE 17

In a glass tube were placed 10 g of the polycarbosilane having a number average molecular weight of 400 among those obtained in Example 1 and 3 g of AlC$_3$H$_9$ and then air in the tube was substituted with argon gas. After the tube was sealed, the polycondensation reaction was effected at room temperature by irradiating $\gamma$-ray of $1.8 \times 10^8$ roentgen from a source of Co-60 45 KCi to obtain 11.5 g of an organosilicon high molecular weight compound containing aluminum. This compound had a number average molecular weight of 1,500 and an intrinsic viscosity of 0.51.

This compound was spun in a usual spinning method to form filaments. The filaments were subjected to a non-fusing treatment at room temperature in air with a $\gamma$-ray source of Co-60 45 KCi, heated by raising the temperature up to 1,250° C. at a rate of 100° C./hr in a stream of argon gas and then maintained at 1,300° C. for 1 hour to obtain silicon carbide fibers (field: 62%).

The thus obtained fibers had a mean tensile strength of 350 kg/mm$^2$ and a mean resiliency of 20 ton/mm$^2$ when the average diameter of the fiber was 10 μm. When the oxidation test was made by heating the fibers at 1,300° C. in air for 50 hours, the oxidation increment was 50% lower than that of the fiber containing no aluminum.

What is claimed is:

1. An organosilicon high molecular weight compound useful for the production of silicon carbide moldings, which comprises silicon and carbon as the main skeleton components, has a number average molecular weight of 500–30,000, an intrinsic viscosity of 0.01–1.50, a silicon carbide residual amount of not less than 40% by weight after baking at a temperature of 800°–1,500° C. in a non-oxidizing atmosphere and consists of a polycarbosilane represented by the following molecular structures:

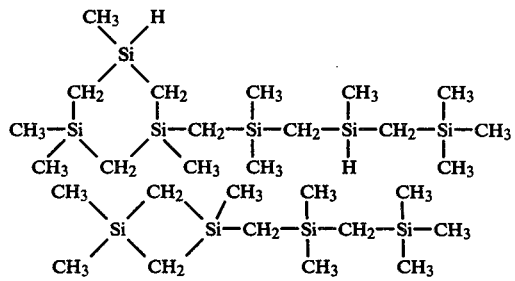

2. A method of producing organosilicon high molecular weight compounds useful for the production of silicon carbide moldings as defined in claim 1, which comprises polycondensing at least one organosilicon compound selected from the group consisting of
(1) compounds having only Si—C bond,
(2) compounds having Si—H bond in addition to Si—C bond,
(3) compounds having Si—Hal bond,
(4) compounds having Si—N bond,
(5) Si-OR organoalkoxy (or aroxy)silanes,
(6) compounds having Si—OH bond,
(7) compounds having Si—Si bond,
(8) compounds having Si—O—Si bond,
(9) esters of organosilicon compounds, and
(10) peroxide of organosilicon compounds,
by irradiation with γ-ray or X-ray under vacuum or in gaseous atmosphere selected from an inert gas, hydrogen gas, CO gas, $CO_2$ gas, hydrocarbon gas and organosilicon compound gas.

3. A method of producing organosilicon high molecular weight compounds useful for the production of silicon carbide moldings containing silicon and carbon as the main skeleton components and at least one foreign element other than silicon, carbon, hydrogen and oxygen and consisting of at least one of linear polycarbosilanes, cyclic polycarbosilanes and polycarbosilanes in which linear and cyclic polycarbosilanes are chemically bonded, which has a number average molecular weight of 500–30,000, an intrinsic viscosity of 0.01–1.50, a foreign element amount of 0.01–25% by weight and a silicon carbide residual amount of not less than 40% by weight after baking at a temperature of 800°–1,500° C. in a non-oxidizing atmosphere, which comprises thermally polycondensing a mixture of a least one organosilicon compound selected from the group consisting of
(1) compounds having only Si-C bond,
(2) compounds having Si-H bond in addition to Si-C bond,
(3) compounds having Si-Hal bond,
(4) compounds having Si-N bond,
(5) Si-OR organoalkoxy (aroxy)silanes,
(6) compounds having Si—OH bond,
(7) compounds having Si—Si bond,
(8) compounds having Si—O—Si bond,
(9) esters of organosilicon compounds, and
(10) peroxides of organosilicon compounds,
and at least one of the organosilicon compound of the group (4) and organometallic compounds selected from the group consisting of
(11) organometallic compounds containing a metal of Group I (inclusive coordination compounds),
(12) organometallic compounds containing a metal of Group II (inclusive coordination compounds),
(13) organometallic compounds containing a metal of Group III (inclusive coordination compounds),
(14) organometallic compounds containing a metal of Group IV (inclusive coordination compounds),
(15) organometallic compounds containing a metal of Group V (inclusive coordination compounds),
(16) organometallic compounds containing a metal of Group VI (inclusive coordination compounds).
(17) organometallic compounds containing a metal of Group VII (inclusive coordination compounds, and
(18) organometallic compounds containing a metal of Group VIII (inclusive coordination compounds),
at a temperature of 200°–1,500° C. under vacuum or in a gaseous atmosphere selected from an inert gas, hydrogen gas, CO gas, $CO_2$ gas, hydrocarbon gas and organosilicon compound gas.

4. A method as claimed in claim 3, wherein said polycondensation reaction is effected by irradiation of γ-ray, X-ray, UV-ray or electron beam instead of the heating.

5. A method as claimed in claim 3, wherein said thermal polycondensation reaction is effected in the presence of not more than 10% of a free-radical initiator.

6. A method as claimed in claim 5, wherein said free-radical initiator is benzoyl peroxide, di-tert.-butyl peroxyoxalate, di-tert.-butyl peroxide or azobisisobutylronitrile.

* * * * *